(12) United States Patent
Kirchberger

(10) Patent No.: US 7,574,985 B2
(45) Date of Patent: Aug. 18, 2009

(54) TWO-STROKE INTERNAL COMBUSTION ENGINE

(76) Inventor: Roland Kirchberger, Dr. Emperger-Weg 28/1/3, Graz (AT) A 8052

( * ) Notice: Subject to any disclaimer, the term of this patent is extended or adjusted under 35 U.S.C. 154(b) by 28 days.

(21) Appl. No.: 11/658,051

(22) PCT Filed: Jul. 8, 2005

(86) PCT No.: PCT/AT2005/000256

§ 371 (c)(1),
(2), (4) Date: Jan. 22, 2007

(87) PCT Pub. No.: WO2006/007614

PCT Pub. Date: Jan. 26, 2006

(65) Prior Publication Data

US 2008/0083381 A1      Apr. 10, 2008

(30) Foreign Application Priority Data

Jul. 21, 2004      (AT) .............................. A 1241/2004

(51) Int. Cl.
*F02B 25/00* (2006.01)
*F02M 69/10* (2006.01)
(52) U.S. Cl. .................................. 123/73 A; 123/73 C
(58) Field of Classification Search ............... 123/73 A, 123/73 B, 73 BA, 73 C, 73 CA, 73 PP, 74 A, 123/74 AA
See application file for complete search history.

(56) References Cited

U.S. PATENT DOCUMENTS

| 3,190,271 | A | * | 6/1965 | Gudmundsen | 123/73 B |
| 3,698,368 | A | * | 10/1972 | Yamamoto | 123/495 |
| 3,730,149 | A | * | 5/1973 | Brown | 123/73 R |
| 4,706,618 | A | * | 11/1987 | Laimbock | 123/73 AA |
| 4,779,581 | A | | 10/1988 | Maier | |
| 4,876,999 | A | * | 10/1989 | Schierling et al. | 123/252 |
| 5,144,919 | A | | 9/1992 | Franz | |
| 5,159,903 | A | * | 11/1992 | Takahashi | 123/65 A |
| 5,503,119 | A | | 4/1996 | Glover | |
| 5,762,040 | A | * | 6/1998 | Taipale et al. | 123/299 |
| 5,857,449 | A | * | 1/1999 | Ishikawa et al. | 123/557 |
| 5,901,673 | A | * | 5/1999 | Ishikawa | 123/73 B |

FOREIGN PATENT DOCUMENTS

| EP | 0 980 969 A2 | 2/2000 |
| JP | 07 259707 A | 10/1995 |
| JP | 2000 283008 A | 2/2001 |

OTHER PUBLICATIONS

International Search Report.

* cited by examiner

*Primary Examiner*—Mahmoud Gimie
(74) *Attorney, Agent, or Firm*—Collard & Roe, P.C.

(57) ABSTRACT

A two-stroke internal combustion engine with at least one cylinder (1), comprising a crankcase (2) flow-connected to the cylinder (1) by at least one transfer passage (3) and provided with an air intake manifold (4) and comprising an injection device for optional introduction of a fuel into the cylinder (1) or the crankcase (2) is described. To achieve fuel-air mixing adapted to the operating state of the engine it is proposed that the injection device comprises at least one injection nozzle (11) which is oriented toward the inlet region (12) of the transfer passage (3) issuing from the air intake manifold (4) and can be controlled as a function of the direction of movement of the piston (5) and the controller of the transfer passage (3).

4 Claims, 3 Drawing Sheets

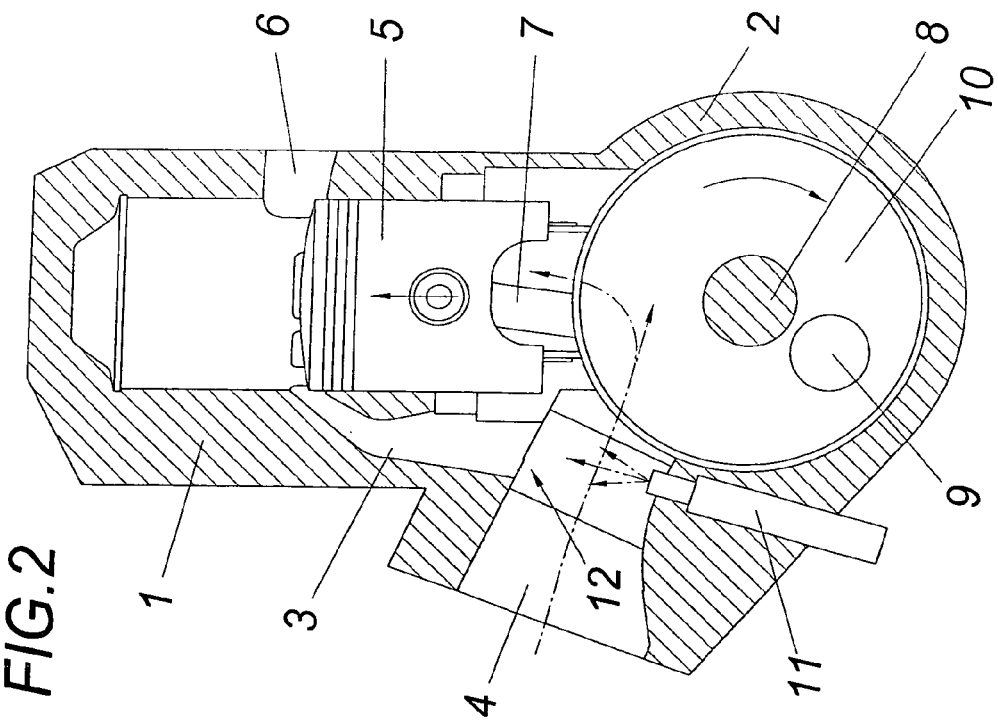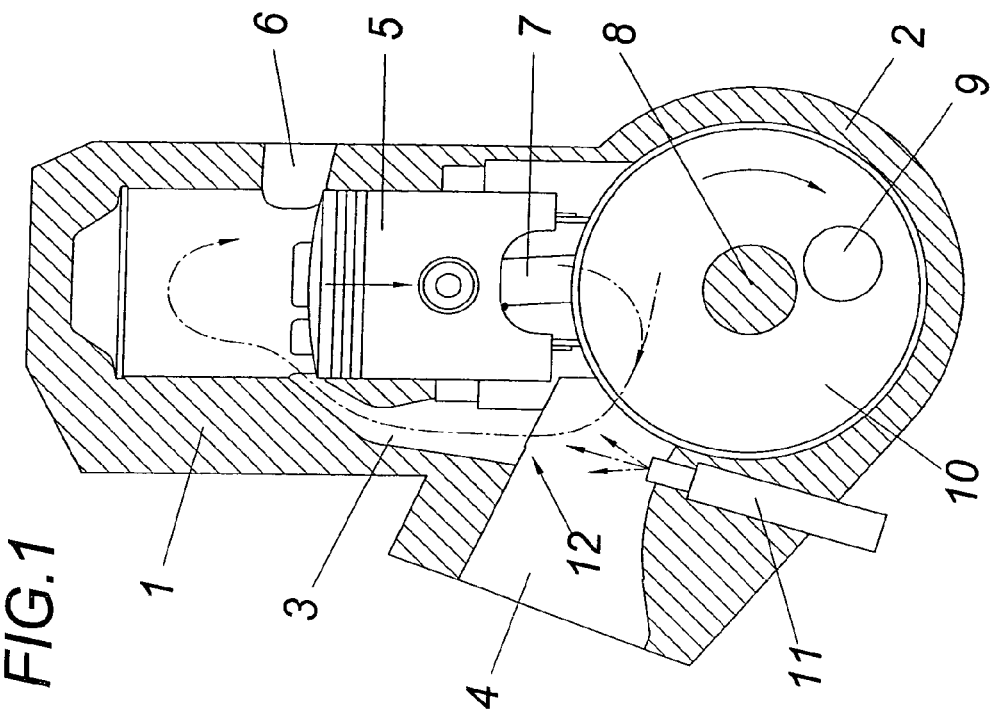

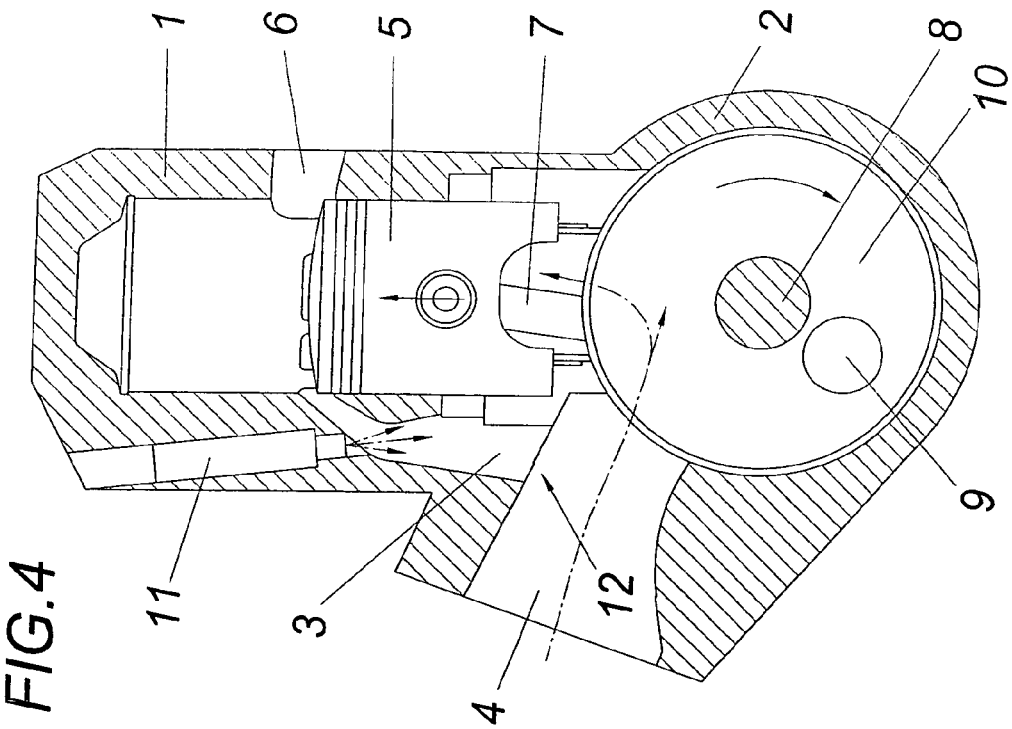
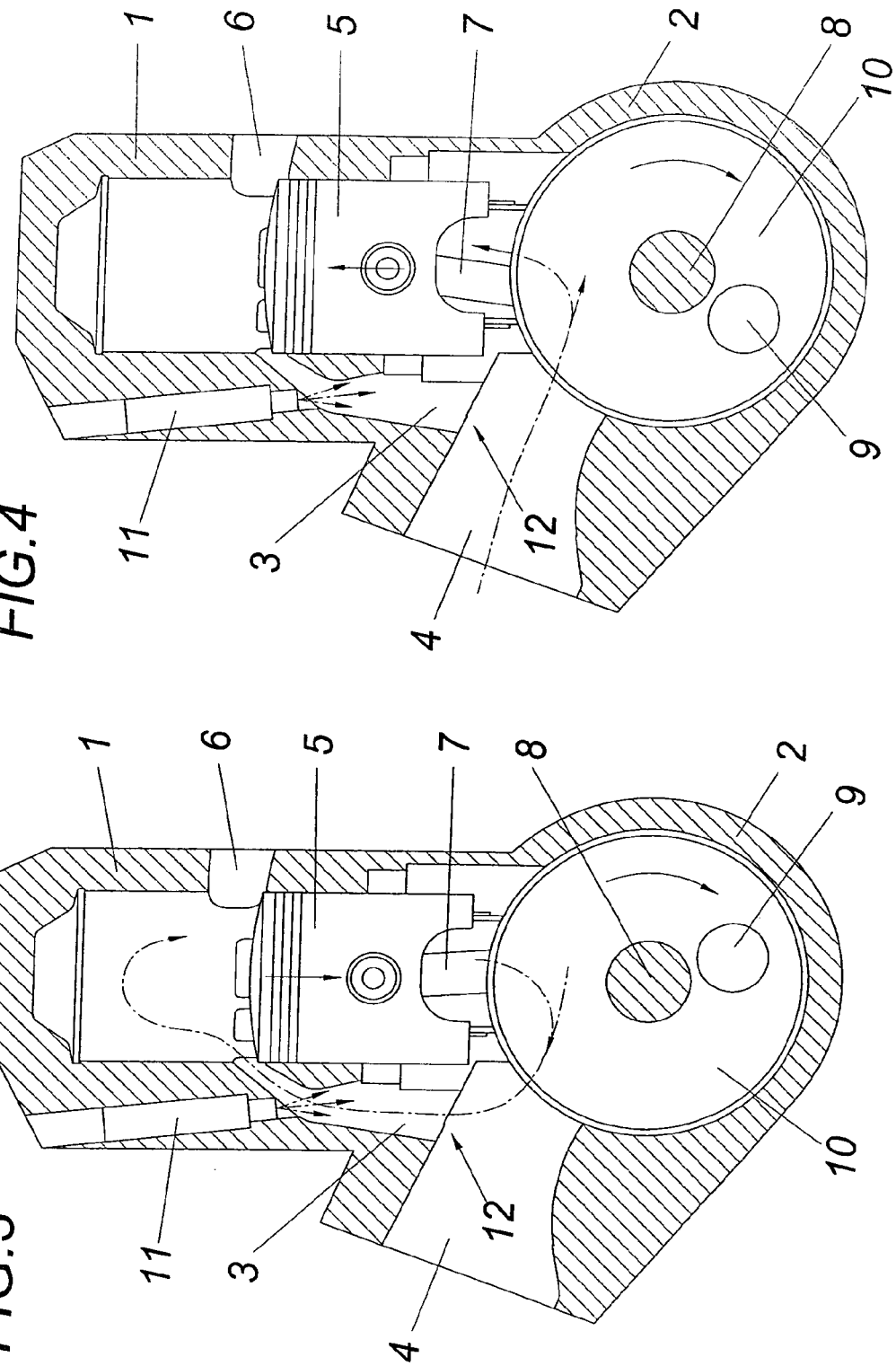

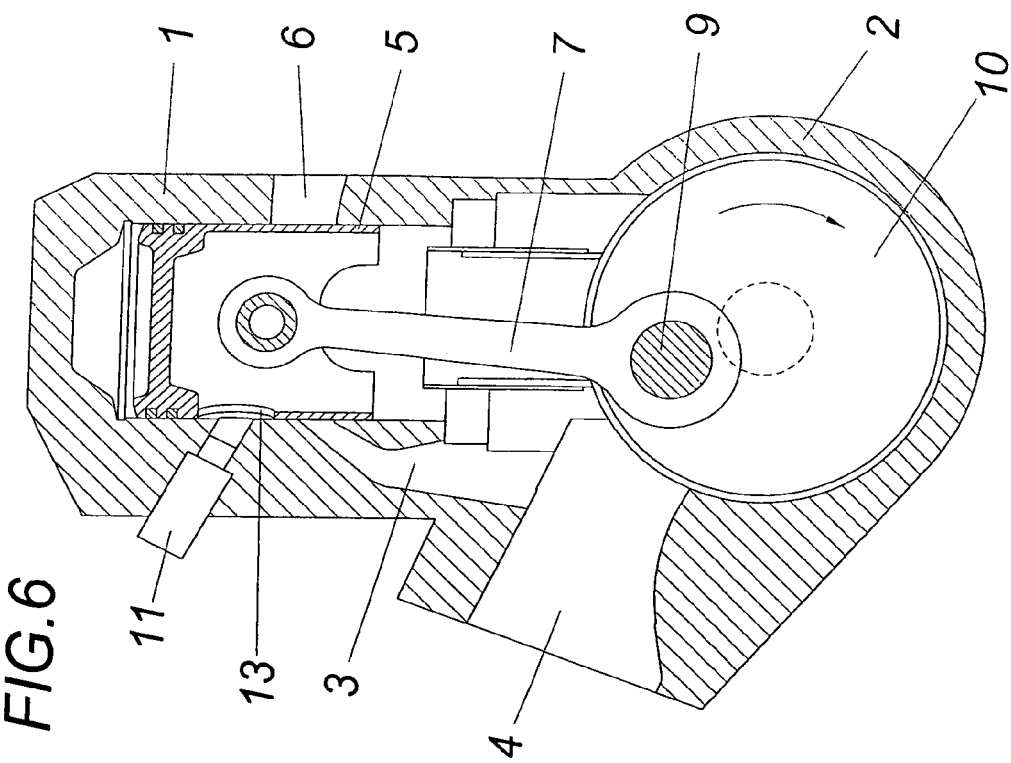
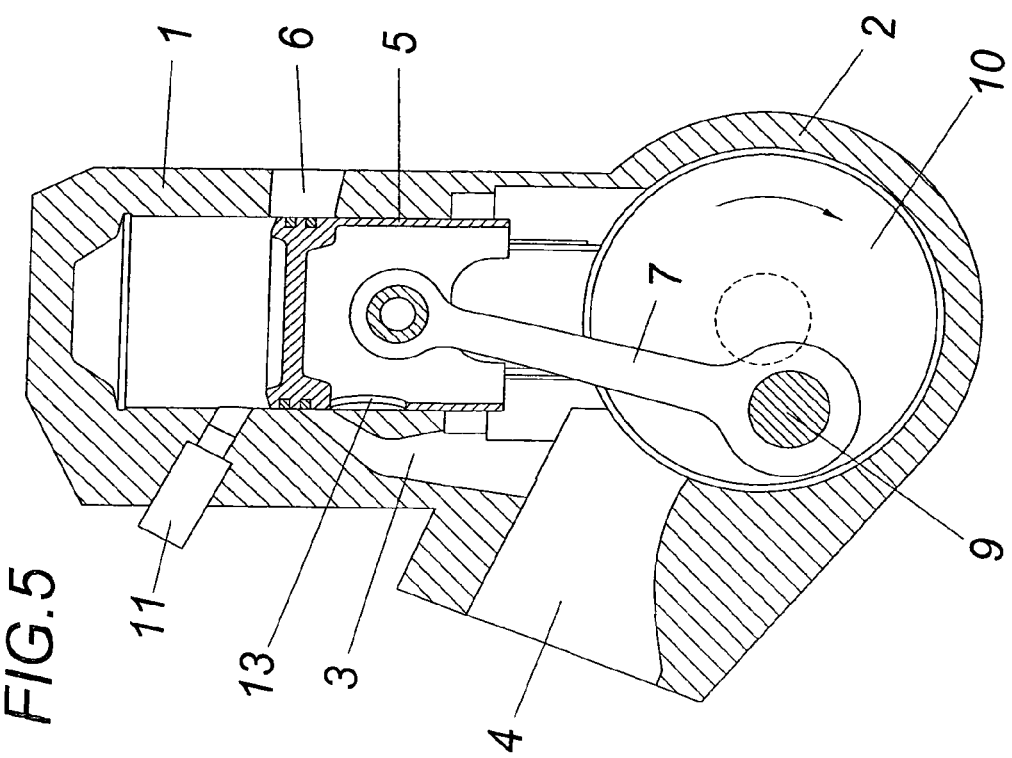

TWO-STROKE INTERNAL COMBUSTION ENGINE

CROSS REFERENCE TO RELATED APPLICATIONS

Applicant claims priority under 35 U.S.C. §119 of Austrian Application No. A 1241/2004 filed Jul. 21, 2004. Applicant also claims priority under 35 U.S.C. §365 of PCT/AT2005/000256 filed Jul. 8, 2005. The international application under PCT article 21(2) was not published in English.

FIELD OF THE INVENTION

The invention relates to a two-stroke internal combustion engine with at least one cylinder, comprising a crankcase flow-connected to the cylinder by at least one transfer passage and provided with an air intake manifold and comprising an injection device for optional introduction of a fuel into the cylinder or the crankcase.

DESCRIPTION OF THE PRIOR ART

To reduce the scavenging losses in two-stroke internal combustions engine with fuel-air mixing by injection of fuel into the fresh air drawn into the crankcase, the fuel can either be injected into the cylinder in the region of the transfer passage, in the case of transfer of the air drawn into the crankcase, or be injected directly into the cylinder. In both cases delayed fuel injection is possible to reduce the scavenging losses. Delayed fuel injection is accompanied by incomplete fuel-air mixing however, and this leads to reduced engine speed strength and incomplete combustion. To avoid these drawbacks it has already been proposed (U.S. Pat. No. 4,779,581 A) to inject the fuel, as a function of the engine loading or the engine speed, either into the air drawn into the crankcase or into the cylinder through the transfer passage in the discharge region thereof. For this purpose a respective injection nozzle is arranged in the air intake manifold of the crankcase and in the mouth region of the transfer passage, with the injection nozzle being controlled, optionally as a function of the engine speed, by a controller, so with high engine speeds the fuel is injected via the injection nozzle into the air drawn into the crankcase in the air intake manifold for fuel-air mixing, but at low speeds is injected via the cylinder-side injection nozzle into the combustion air transferring from the crankcase into the cylinder. The drawback of this known injection device however is the construction expenditure which results due to the injection nozzles that are associated with the crankcase on the one hand and the cylinder on the other.

SUMMARY OF THE INVENTION

The object underlying the invention is therefore to configure a two-stroke internal combustion engine of the type described in the introduction such that fuel-air mixing dependent on engine loading is possible in either the crankcase or the cylinder, without the increased construction expenditure as a result of separate injection nozzles having to be accepted.

The invention achieves the stated object in that the injection device comprises at least one injection nozzle which is oriented toward the inlet region of the transfer passage issuing from the air intake manifold and can be controlled as a function of the direction of movement of the piston and the controller of the transfer passage.

The conveying distance of the injected fuel depends, according to the orientation of the injection nozzle in the direction of the inlet region of the transfer passage issuing from the air intake manifold, on the air flow prevailing in the region of the injection nozzle and therewith on the direction of movement of the piston and control of the transfer passage through the piston. If, during the compression stroke of the piston, air is drawn into the crankcase by way of the air intake manifold, the fuel injected toward the inlet region of the transfer passage is carried along with the drawn-in air into the crankcase for fuel-air mixing. However, in the case of fuel injection at the end of the power stroke of the piston, the fuel, when the transfer passage is open, is carried along with the air conveyed from the crankcase via the transfer passage into the cylinder, so air-fuel mixing can take place in the transfer passage and in the cylinder in a delayed manner for scavenging. By selecting the injection interval as a function of the direction of movement of the piston and the controller of the transfer passage, fuel-air mixing can take place, depending on the engine speed or the engine loading, inside the crankcase or outside it in order to keep the scavenging losses low on the one hand and to ensure good speed strength on the other hand.

Particularly simple construction conditions result in this connection if the injection nozzle is arranged on the peripheral side of the air intake manifold opposing the inlet region of the transfer passage. In this case the spray cone of the injection nozzle extends transversely to the air intake manifold, and this creates advantageous flow conditions for carrying along the injected fuel both when drawing the air into the crankcase and when transferring the drawn-in air into the cylinder.

A construction variant results if the injection nozzle ends in the transfer passage at a spacing from the inlet region and is oriented counter to the transfer direction. The fuel injected into the transfer passage in the opposite direction to the air flow results in particularly intimate mixing with the transferring air which introduces the fuel into the cylinder counter to the injection direction. When the transfer passage is closed the injected fuel passes into the inlet region of the transfer passage and is conveyed with the drawn-in air into the crankcase for fuel-air mixing.

A further possibility of forming the fuel-air mixture as a function of the engine speed or the engine loading inside or outside the crankcase is characterised in that the injection device comprises at least one injection nozzle that ends in the cylinder between the two dead centres of the piston and that can be controlled as a function of the stroke position of the piston, and in that, at the peripheral side facing the injection nozzle, the piston comprises a jacket opening for injecting fuel into the crankcase. The conveying distance of the injected fuel depends on the selected injection interval in this case as well. If the fuel is injected in an upper stroke position region of the piston, the fuel passes through the jacket opening located in the region of the spray cone of the injection nozzle onto the piston side facing the crankcase and is introduced into the crankcase by the piston for fuel-air mixing in order to then be supplied to the cylinder via the transfer passage in an appropriately processed mixture. If, however, injection takes place in a lower stroke position of the piston, which frees the injection nozzle, the fuel is injected directly into the cylinder in order to mix with the air transferring from the crankcase for delayed fuel-air mixing. It is therefore apparent that with such an arrangement of the injection nozzle, fuel-air mixing inside or outside the crankcase can be selected by control of the injection nozzle as a function of the stroke position of the piston.

BRIEF DESCRIPTION OF THE DRAWING

The subject matter of the invention is illustrated by way of example in the drawings, in which:

FIG. 1 shows in a schematic axial section a two-stroke internal combustion engine according to the invention in a rotary position characteristic of fuel injection for fuel-air mixing outside the crankcase, FIG. 2 shows the two-stroke internal combustion engine according to FIG. 1 in a rotary position for fuel injection for fuel-air mixing inside the crankcase, FIGS. 3 and 4 show an illustration of the two-stroke internal combustion engine corresponding to FIGS. 1 and 2 with an arrangement of the injection nozzle that is different from FIGS. 1 and 2, FIG. 5 shows an illustration corresponding to FIG. 1 of a construction variant of a two-stroke internal combustion engine according to the invention in a rotary position for fuel injection for fuel-air mixing outside of the crankcase, and FIG. 6 shows the two-stroke internal combustion engine according to FIG. 3 in a rotary position for injecting the fuel for fuel-air mixing inside the crankcase.

DESCRIPTION OF THE PREFERRED EMBODIMENTS

The two-stroke internal combustion engine according to FIGS. 1 and 2 comprises at least one cylinder 1 which, together with a crankcase 2, forms a motor unit. Provided between the crankcase 2 and the cylinder 1 is at least one transfer passage 3 which issues from the air intake manifold 4 via which air is drawn into the crankcase 2 by way of a non-return valve connected upstream and, more precisely, with the aid of the crankcase pump produced by the piston 5. The piston 5, which is guided in the cylinder 1 and controls the transfer passage 3 and optionally provided additional transfer passages and the outlet passage 6, is conventionally connected by a connecting rod 7 to a crankshaft 8 mounted in the crankcase 2, the crank webs of which crankshaft, which receive the crank pins 9 for mounting the connecting rod 7, are designated 10.

An injection nozzle 11 which is controlled by a controller (not shown) is used for injecting fuel. This injection nozzle 11 is arranged on the side of the air intake manifold 4 that opposes the inlet region 12 of the transfer passage 3 and is oriented in the direction of the inlet region 12 of the transfer passage 3. If the injection nozzle 11 is controlled, according to FIG. 1, during release of the transfer passage 3 at the end of the power stroke, before the piston 5 has reached the lower dead centre, the fuel is injected into the air transferring through the transfer passage 3 from the crankcase 2, as is indicated by the dot-dash flow arrows for air conduction in FIG. 1. This means that fuel-air mixing takes place outside the crankcase 2 in the region of the transfer passage 3 and subsequently in the cylinder 1 and can thus be controlled over time in such a way that scavenging losses are avoided in the case of low engine speeds or partial loading.

For higher speeds and full loading good fuel-air processing in the crankcase takes effect if the injection interval is shifted into the intake phase of the air into the crankcase 2 according to FIG. 2, in other words in the region of the compression stroke of the piston 5. In this case the fuel injected toward the inlet region 12 of the transfer passage 3 is carried along into the crankcase 2 with the flow of drawn-in air, illustrated by the dot-dash flow arrows, in order to convey an appropriately processed mixture through the transfer passage 3 into the cylinder in the end region of the subsequent power stroke of the piston 5. The injection interval for the injection nozzle 11 can therefore be selected as a function of the respective direction of movement of the piston 5 such that the fuel is either discharged through the transfer passage 3 with a delay to the scavenging air or to the fresh air drawn into the crankcase 2 by the crankcase pump.

In contrast to the embodiment according to FIGS. 1 and 2 the injection nozzle 11 according to FIGS. 3 and 4 is not associated with the air intake manifold 4 but with the transfer passage 3 and, more precisely, the injection nozzle 11 ends in the transfer passage 3 at a spacing from the inlet region 12, with the fuel being injected toward the inlet region counter to the transfer direction. Owing to this arrangement of the injection nozzle 11, the fuel, with fuel-air mixing outside of the crankcase 2 according to FIG. 3, is injected counter to the direction of the air transferring from the crankcase 2 into the cylinder 1, and this leads to particularly intimate fuel-air mixing. For fuel-air mixing inside the crankcase 2 the fuel is injected, according to FIG. 4, via the transfer passage 3 into the air intake manifold 4 where it is carried along by the fresh air drawn into the crankcase 2.

According to the embodiment of FIGS. 5 and 6 the injection nozzle 11 is arranged in the cylinder region and directed into the combustion chamber. The arrangement in this case is such that, in the region of an upper stroke position of the piston 5, the injection nozzle 11 is directed toward a jacket opening 13 of the piston 5, so the fuel can be introduced, according to FIG. 4, into the crankcase 2 via the piston 5 in order to ensure good fuel-air mixing in the crankcase 2. The processed fuel-air mixture is then conventionally conveyed through the transfer passage 3 into the cylinder 1. If, however, the injection interval of the injection nozzle 11 is shifted such that the piston 5 is in a lower piston position, the fuel is injected directly into the cylinder 1, according to FIG. 3, and, with respect to scavenging, this may be controlled with a delay to avoid scavenging losses. A two-stroke internal combustion engine, which can be operated, as a function of the speed or engine loading, with fuel-air mixing inside and outside of the crankcase 2, is therefore also obtained with the embodiment according to FIGS. 5 and 6 to achieve an advantageous adaptation to the respective operating conditions.

The invention claimed is:

1. Two-stroke internal combustion engine with at least one cylinder and a piston guided in the cylinder, comprising a crankcase flow-connected to the cylinder by at least one transfer passage and provided with an air intake manifold and comprising an injection device for selective introduction of a fuel into the cylinder or the crankcase, wherein the injection device comprises at least one injection nozzle which is oriented toward an inlet region of the transfer passage, the transfer passage starts at the air intake manifold, and the injection device is controlled as a function of the direction of movement of the piston and the controller of the transfer passage.

2. Two-stroke internal combustion engine according to claim 1, wherein the injection nozzle is arranged on a peripheral side of the air intake manifold opposing the inlet region of the transfer passage.

3. Two-stroke internal combustion engine according to claim 1, wherein the injection nozzle ends in the transfer passage at a spacing from the inlet region and is oriented counter to the transfer direction.

4. Two-stroke internal combustion engine with a combustion chamber, at least one cylinder having an upper region and a piston guided in the cylinder, said engine comprising a crankcase flow-connected to the cylinder by at least one transfer passage and provided with an air intake manifold and comprising an injection device for selective introduction of a fuel into the cylinder or the crankcase, wherein at a peripheral side facing the at least one infection nozzle the piston comprises a jacket opening for infecting fuel into the crankcase, wherein the injection device comprises at least one injection nozzle arranged in said upper region and directed into the combustion chamber, and wherein said at least one injection nozzle ends in the cylinder between the two dead points at the end of the piston opposite the crankcase and that is controlled as a function of the stroke position of the piston.

* * * * *

UNITED STATES PATENT AND TRADEMARK OFFICE
CERTIFICATE OF CORRECTION

| | | |
|---|---|---|
| PATENT NO. | : 7,574,985 B2 | Page 1 of 1 |
| APPLICATION NO. | : 11/658051 | |
| DATED | : August 18, 2009 | |
| INVENTOR(S) | : Kirchberger | |

It is certified that error appears in the above-identified patent and that said Letters Patent is hereby corrected as shown below:

In Column 4, line 64, (Line 14 of Claim 4) after the word "and" please delete: "that".

Signed and Sealed this

Thirteenth Day of October, 2009

David J. Kappos
*Director of the United States Patent and Trademark Office*